United States Patent
Ghosh et al.

(10) Patent No.: US 9,676,253 B2
(45) Date of Patent: Jun. 13, 2017

(54) DUAL TEMPERATURE HVAC SYSTEM

(71) Applicant: MAHLE International GmbH, Stuttgart (DE)

(72) Inventors: Debashis Ghosh, Williamsville, NY (US); Mingyu Wang, Amherst, NY (US); Jeffrey C. Kinmartin, East Amherst, NY (US); Prasad S. Kadle, Williamsville, NY (US)

(73) Assignee: MAHLE International GmbH, Stuttgart (DE)

( * ) Notice: Subject to any disclaimer, the term of this patent is extended or adjusted under 35 U.S.C. 154(b) by 314 days.

(21) Appl. No.: 14/277,121

(22) Filed: May 14, 2014

(65) Prior Publication Data

US 2015/0328956 A1 Nov. 19, 2015

(51) Int. Cl.
*B60H 1/32* (2006.01)
*B60H 1/00* (2006.01)

(52) U.S. Cl.
CPC ....... *B60H 1/3202* (2013.01); *B60H 1/00071* (2013.01); *B60H 2001/00135* (2013.01)

(58) Field of Classification Search
CPC .... B60H 1/00071; B60H 1/3202; B60H 1/32; B60H 2001/00135
See application file for complete search history.

(56) References Cited

U.S. PATENT DOCUMENTS

| | | | |
|---|---|---|---|
| 4,711,295 A | 12/1987 | Sakurai | |
| 4,949,779 A | 8/1990 | Kenny et al. | |
| 5,282,367 A | 2/1994 | Moore et al. | |
| 5,309,731 A | 5/1994 | Nonoyama et al. | |
| 5,461,878 A | 10/1995 | Moore et al. | |
| 6,192,698 B1 * | 2/2001 | Kakehashi | B60H 1/00064 165/203 |
| 2003/0000691 A1 * | 1/2003 | Kim | B60H 1/00064 165/203 |
| 2010/0304654 A1 * | 12/2010 | Kakizaki | B60H 1/00064 454/121 |
| 2011/0005732 A1 | 1/2011 | Seto | |
| 2011/0009044 A1 | 1/2011 | Seto et al. | |

* cited by examiner

*Primary Examiner* — Len Tran
*Assistant Examiner* — Ana Vazquez
(74) *Attorney, Agent, or Firm* — Brinks Gilson & Lione

(57) ABSTRACT

A heating, ventilation, and air conditioning (HVAC) system for a vehicle includes an evaporator and a diffuser. The evaporator is configured to cool air passing through the evaporator. The diffuser is configured to direct a first portion of the air entering the diffuser through a first section of the evaporator, and direct a second portion of the air entering the diffuser through a second section of the evaporator. The evaporator and the diffuser are configured to cooperate such that air exits the first section at a first temperature and air exits the second section at a second temperature less than the first temperature.

5 Claims, 2 Drawing Sheets

DUAL TEMPERATURE HVAC SYSTEM

TECHNICAL FIELD OF INVENTION

This disclosure generally relates to heating, ventilation, and air conditioning (HVAC) systems, and more particularly relates to a system that outputs two different temperatures of conditioned air from a shared evaporator.

BACKGROUND OF INVENTION

It is known that the energy efficiency of a vehicle heating, ventilation, and air conditioning (HVAC) system can be improved while still maintaining occupant comfort if spot cooling is used to direct tempered air onto an occupant. A comfortable temperature for spot cooling air is, for example, 24° C. In contrast, air discharged by the system for general or volume cooling of the vehicle cabin is preferably much colder, 6° C. to 15° C. for example. However, since spot cooling makes occupant comfort is less reliant on the average temperature of the cabin, the total amount of air discharged for cooling of the volume of cabin can be reduced. That is, spot cooling can be used to maintain occupant comfort in spite of the occupant residing in a higher than normal cabin temperature, 28° C.-32° C. for example instead of a more typical cabin temperature of 24° C.

Prior attempts to provide spot cooling air and cabin volume cooling air at have used airflow delivered for spot cooling and cabin cooling at the same temperature. That is, air from across the evaporator had a relatively uniform temperature. Indeed, significant design effort is expended on the fan-scroll and diffuser design to achieve both airflow and temperature uniformity across the evaporator face. If distinct temperatures at different locations in a vehicle are desired, multiple evaporators are typically used, which undesirably increases system cost. Alternatively, reheating of relatively cold (e.g. 3-8° C.), conditioned air from the evaporator is used to provide comfortable spot cooling air at a warmer temperature (e.g. 24° C.), which undesirably reduces system energy efficiency.

SUMMARY OF THE INVENTION

In accordance with one embodiment, a heating, ventilation, and air conditioning (HVAC) system for a vehicle is provided. The system includes an evaporator and a diffuser. The evaporator is configured to cool air passing through the evaporator. The diffuser is configured to direct a first portion of the air entering the diffuser through a first section of the evaporator, and direct a second portion of the air entering the diffuser through a second section of the evaporator. The evaporator and the diffuser are configured to cooperate such that air exits the first section at a first temperature and air exits the second section at a second temperature less than the first temperature.

In one embodiment, the diffuser is configured to direct the first portion through the first section at a first velocity, and direct the second portion through the second section at a second velocity less than the first velocity.

In another embodiment, the system includes a partition configured to segregate the first portion of air from the second portion of air.

In yet another embodiment, the system includes an upstream valve operable to vary the first velocity.

In yet another embodiment, the system includes an upstream valve operable to vary the first velocity relative to the second velocity.

In yet another embodiment, the system includes a downstream valve operable to vary a mixture ratio of air at the second temperature with air at the first temperature.

In yet another embodiment, the first section of the evaporator is directed to spot cool an occupant residing in a cabin of the vehicle, and air from the second section of the evaporator is directed to volume cool the cabin of the vehicle.

In yet another embodiment, the system includes a nozzle configured to direct the air from the first section of the evaporator toward the occupant of the vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
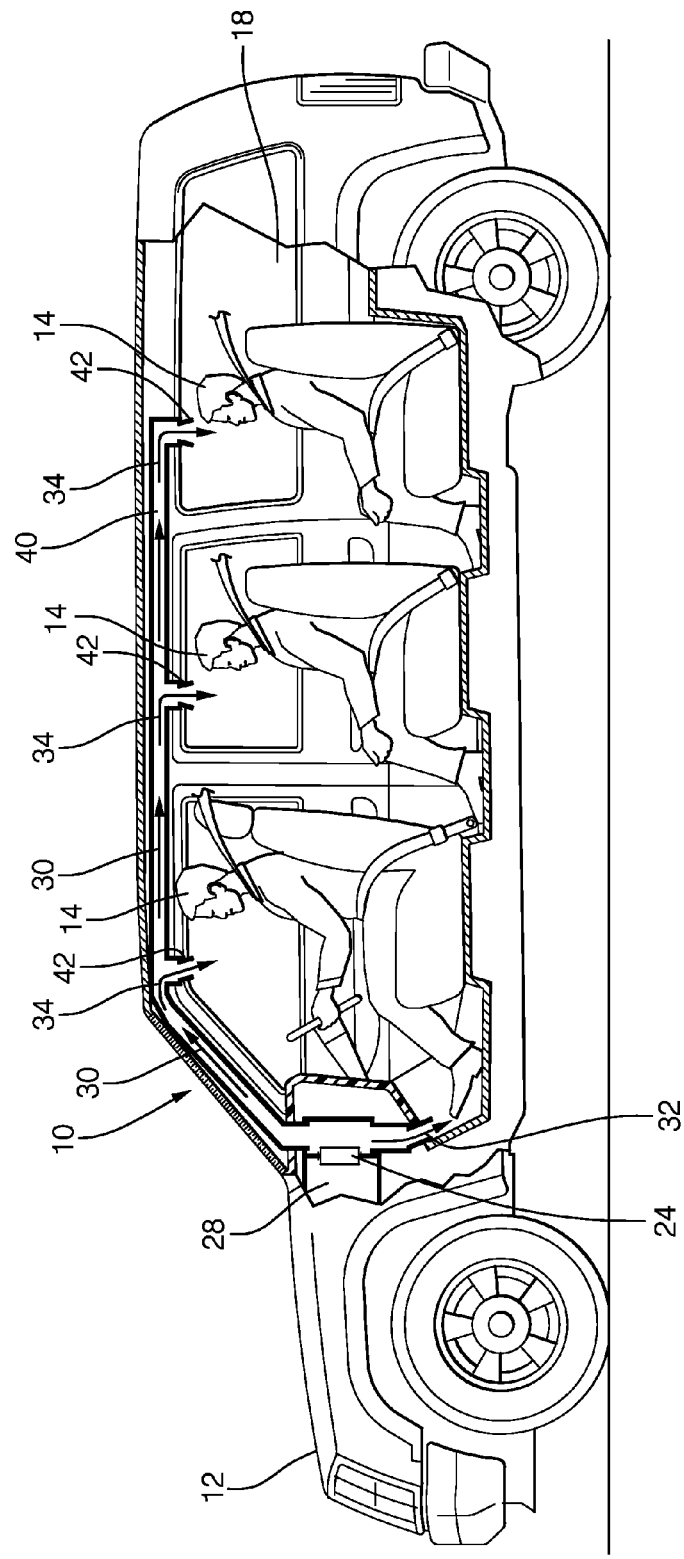
FIG. 1 is cut-away view of a vehicle equipped with an HVAC system in accordance with one embodiment.

FIG. 1 illustrates a non-limiting example of a heating, ventilation, and air conditioning (HVAC) system, hereafter the system 10, configured for use in a vehicle 12 to provide a perceived comfortable thermal environment to an occupant 14 seated in a cabin 18 of the vehicle 12. It is contemplated that the system 10 described herein may also be adapted to be used in other types of vehicles, such as sedans, trucks, busses, or airplanes.

In general, the system 10 is configured to provide spot cooling to the occupants 14. As used herein, spot cooling means directing a stream of air at a preferred temperature and flow rate toward a thermally sensitive portion of the occupant's body to provide a heat loss rate for the sensitive portion so the occupant perceives that the cabin 18 is at a comfortable temperature, 24° C. for example, while the average cabin ambient temperature is actually higher, 30° C. for example.

It has been observed that the thermal comfort of an occupant 14 in a vehicle cabin 18 may be estimated based on a heat loss rate of the occupant 14. For example, the occupant 14 may typically be comfortable in an ambient temperature of 24° C. If the heat loss rate of the occupant 14 is higher than when the ambient temperature is 24° C., the occupant 14 tends to feel cooler. If the heat loss rate of the occupant 14 is lower than when in an environment with an ambient temperature of 24° C., the occupant 14 tends to feel warmer.

It has been estimated that about 30% energy savings may be realized if the ambient temperature of the cabin 18 is maintained at 30° C. rather than 24° C. Rather than maintaining the entire vehicle cabin 18 at a comfortable ambient temperature of 24° C., the system described herein provides spot cooling to maintain the heat loss rate of the occupant 14 in the cabin 18 at a rate that is similar to a cabin temperature of 24° C., while allowing a higher cabin temperature, for example 30° C. A further explanation of spot cooling is presented in *Thermal Sensation and Comfort Models for Non-Uniform and Transient Environments: Part I: Local Sensation of Individual Body Parts"*, Indoor Environmental Quality (IEQ), Center for the Built Environment, Center for Environmental Design Research, University of California by Zhang et al.—Berkeley, 2009.

Figure 2:
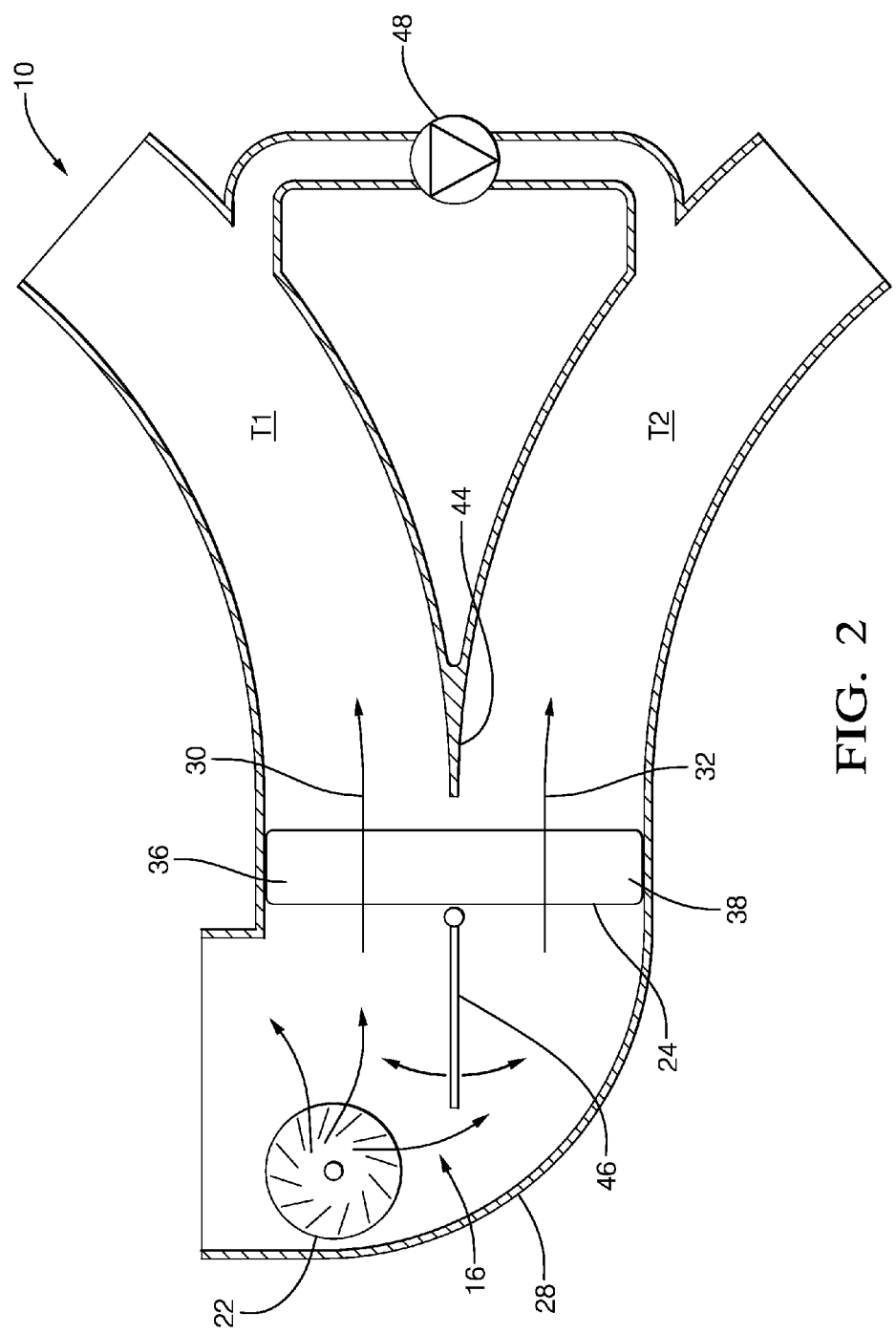
FIG. 2 is a sectional view of part of the system of FIG. 1 in accordance with one embodiment.

FIG. 2 further illustrates non-limiting features of the system 10 which generally includes a diffuser 28 equipped with a single evaporator, hereafter the evaporator 24. The diffuser/evaporator assembly is typically disposed in a forward region of the vehicle 12. The evaporator 24 is generally configured to cool the air 16 passing through the evaporator 24. Movement of the air 16 may be by way of a fan 22, various suitable configurations of which will be recognized by those in the art. The air 16 may be drawing from outside of the vehicle 12, or from within the cabin 18, or a mixture of the two as will be recognized by those in the art. While the teachings presented herein are generally directed toward cooling, the teachings are generally applicable toward heating. That is, the comfort provided to the occupant 14 by spot cooling when the temperature outside the vehicle is high can also be provide by spot heating when the temperature outside the vehicle is low.

In this non-limiting example, the diffuser 28 is configured to direct a first portion 30 of the air 16 entering the diffuser 28 toward or through a first section 36 of the evaporator 24, and direct a second portion 32 of the air 16 entering the diffuser 28 toward or through a second section 38 of the evaporator 24. By way of a non-limiting example, it may be preferable if the first portion is characterized as between thirty percent (30%) and fifty percent (50%) of the air entering the diffuser. By way of further example, the evaporator 24 and the diffuser 28 are configured so the first portion 30 flows through the evaporator 24 at a greater velocity than the second portion 32. As such, the evaporator 24 and the diffuser 28 cooperate so air exits the first section 36 at a first temperature T1 and air exits the second section 38 at a second temperature T2 less than the first temperature T1. By way of a non-limiting example, it may be preferable if the first temperature is greater than ten degrees Celsius (10° C.), preferably in the range of twelve degrees Celsius (12° C.) to twenty-four degrees Celsius (24° C.), and the second temperature is between four degrees Celsius (4° C.) and twelve degrees Celsius (12° C.).

Controlling or managing the air 16 that flows through the evaporator 24 may be done by way of a 'virtual partition' that arises from the shape of the diffuser proximate to the evaporator 24. For example, if the walls of the diffuser 28 are relatively close (e.g.—less than 20 mm) to inlet face of the evaporator proximate to the second section 38 of the evaporator, and are relatively far away (e.g.—more than 40 mm) from the inlet face of the evaporator 24 proximate to the first section 36, then the relative velocities of the first portion 30 and the second portion 32 can be varied to achieve a desired relative difference between the first temperature T1 and the second temperature T2.

Referring again to FIG. 1, the system 10 may include a duct 40 configured to guide the first portion 30 of the air 16 through one or more nozzles 42 towards temperature sensitive areas of the occupants 14 such as, but not limited to, the face, back of neck, or chest, as illustrated. The second portion 32 of the air 16 may be directed toward the floor of the cabin 18, or through openings in the dashboard area, or other areas by means recognized by those in the art for general cabin cooling and maintain comfortable cabin humidity, as opposed to being directed for spot cooling use.

Referring again to FIG. 2, the system 10 may include a partition 44 configured to segregate the first portion 30 of air from the second portion 32 of air. While the partition 44 is shown as a fixed feature, it is contemplated that the partition could be movable so as to vary the effective size of the first section 36 relative to the second section 38 in response to number of occupants in the vehicle for achieving energy efficiency. Such variable control may be useful to control the value of the first temperature T1 or the second temperature T2, or the relative difference between the two temperatures. Having control over the temperatures may be advantageous during, for example, startup times after the vehicle 12 has been parked and the cabin temperature is uncomfortably high.

In another embodiment, the system 10 may include an upstream valve 46 located on or proximate to the inlet side of the evaporator 24. In general, the upstream valve 46 operable to vary the first velocity of the first portion 30 or vary the first velocity of the first portion 30 relative to the second velocity of the second portion 32. The upstream valve 46 may be employed in conjunction with a fixed version of the partition 44, or a variable version of the partition 44 describe above in order to provide further flexibility to control the first temperature T1 and the second temperature T2. Such flexible control may be particularly advantageous to prevent freezing of the evaporator during high humidity conditions, or to maximize the cool down rate of the cabin 18 when recovering from a hot soak.

In another embodiment, the system 10 may include a downstream valve 48 operable to vary a mixture ratio of air at the second temperature T2 with air at the first temperature T2. The downstream valve 48 may be used in conjunction with or instead of the partition 44 and/or the upstream valve 46 to provide further flexibility with regard to controlling the temperatures and velocities of air flowing into the cabin 18. It is intended that during transient cooling of a heat soaked cabin, the HVAC system adapts to maximize the strength of the spot cooling stream while compromising the strength of the cabin conditioning stream during the initial cool down phase. The objective behind this micro cooling strategy as described earlier is to achieve quicker time to occupant comfort, while the cabin cools down at a slower rate relative to the occupants.

Accordingly, a heating, ventilation, and air conditioning (HVAC) system (the system 10) is provided. The system 10 decreases the cost of a spot-cooling type system by utilizing a single shared evaporator (the evaporator 24) in combination with a diffuser equipped with various features capable to control the velocity of air passing through distinct sections of the evaporator 24. System efficiency is generally improved as the system can output two different temperatures of air with minimal reliance on reheating of already cooled air, while still maintaining excellent occupant comfort. The system 10 described herein stands in contrast to other systems that employ multiple evaporators to provide various temperatures of conditioned air to different locations in a vehicle While this invention has been described in terms of the preferred embodiments thereof, it is not intended to be so limited, but rather only to the extent set forth in the claims that follow.

We claim:

1. A heating, ventilation, and air conditioning (HVAC) system for a vehicle, said system comprising:
   a single fan for blowing air in a downstream direction;
   an evaporator downstream of the single fan and configured to cool air passing through the evaporator;

a diffuser configured to direct a first portion of the air blown by the single fan through a first section of the evaporator, and direct a second portion of the air blown by the single fan through a second section of the evaporator, wherein the evaporator and the diffuser are configured to cooperate such that air exits the first section at a first temperature and at a first velocity, and air exits the second section at a second temperature less than the first temperature and at a second velocity; and an upstream valve disposed in the diffuser between the single fan and the evaporator and operable to vary the first velocity relative to the second velocity;

wherein the first section of the evaporator is aligned with a first downstream duct directed to spot cool an occupant residing in a cabin of the vehicle, and the second section of the evaporator is aligned with a second duct directed to volume cool the cabin of the vehicle, the system further comprising a movable partition immediately downstream of the evaporator configured for selectively diverting a portion of the air exiting the first section of the evaporator to the second duct.

2. The system in accordance with claim 1, wherein the system includes a downstream valve operable to vary a mixture ratio of air at the second temperature with air at the first temperature.

3. The system in accordance with claim 1, wherein the system includes a nozzle configured to direct the air from the first duct toward the occupant of the vehicle.

4. The system in accordance with claim 1, wherein the first temperature is between ten degrees Celsius (10° C.) and twenty-four degrees Celsius (24° C.), and the second temperature is between five degrees Celsius (5° C.) and twelve degrees Celsius (12° C.).

5. The system in accordance with claim 1, wherein the first portion is characterized as between thirty percent (30%) and fifty percent (50%) of the air entering the diffuser.

\* \* \* \* \*